(12) United States Patent
Hong et al.

(10) Patent No.: US 10,771,429 B1
(45) Date of Patent: Sep. 8, 2020

(54) MECHANISMS FOR SOLVING AN IP FRAGMENTATION OVERLAPPING ISSUE IN L2VPN USING MULTIPLE IP ADDRESSES IN GRE HEADERS

(71) Applicant: VMware, Inc., Palo Alto, CA (US)

(72) Inventors: Xinhua Hong, Campbell, CA (US); Yong Wang, San Jose, CA (US); Jia Yu, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/366,776

(22) Filed: Mar. 27, 2019

(51) Int. Cl.
*G06F 15/16* (2006.01)
*H04L 29/12* (2006.01)
*H04L 12/66* (2006.01)
*H04L 12/46* (2006.01)
*H04L 29/06* (2006.01)

(52) U.S. Cl.
CPC ...... *H04L 61/2007* (2013.01); *H04L 12/4633* (2013.01); *H04L 12/4641* (2013.01); *H04L 12/66* (2013.01); *H04L 69/22* (2013.01)

(58) Field of Classification Search
CPC . H04L 12/66; H04L 12/4283; H04L 12/4641; H04L 61/2007; H04L 69/22
USPC ........................................................ 709/245
See application file for complete search history.

(56) References Cited

U.S. PATENT DOCUMENTS

| | | | | |
|---|---|---|---|---|
| 9,525,627 B2* | 12/2016 | Padgett | .................. | H04L 45/16 |
| 2012/0039332 A1* | 2/2012 | Jackowski | .......... | H04L 47/2441 |
| | | | | 370/389 |
| 2017/0019331 A1* | 1/2017 | Yong | ...................... | H04L 45/64 |
| 2017/0208032 A1* | 7/2017 | Cox | .................... | H04L 61/2567 |

OTHER PUBLICATIONS

Networking/Computing Tips/Tricks "The Purpose of the IP ID Field Demystified" dated Mar. 28, 2016, 5 pages.
S. Kent, "IP Encapsulating Security Payload (ESP)", dated Dec. 2005, 44 pages.
G. Dommety, "Key and Sequence Number Extensions to GRE", dated Sep. 2000, 7 pages.

* cited by examiner

*Primary Examiner* — Frantz B Jean

(57) ABSTRACT

In an embodiment, a computer-implemented method for using multiple IP addresses in GRE IP headers to prevent IPID fragmentation overlapping in L2VPN networks is disclosed. In an embodiment, the method comprises: receiving, by an edge service gateway, a packet that requires fragmentating; determining whether the gateway is configured to prevent IPID fragmentation overlapping; and in response to determining that the gateway is configured to prevent IPID fragmentation overlapping, creating a plurality of packet fragments of the packet. A packet fragment comprises a GRE IP header, additional headers, and a portion of the packet. The GRE IP header stores an IPID generated for the packet in an IPID field, a source private IP address in a source IP address field, and a destination private IP address in a destination IP address field. The source private IP address, the destination private IP address and the IPID collectively form a packet identifier of the packet.

20 Claims, 6 Drawing Sheets

FIG. 2A

| 202 L2_header | 222 Src_IP | 224 Des_IP | 225 ... | 227 ... | 230 Other |
|---|---|---|---|---|---|
| | IP Addr | IP Addr | ... | ... | Other |

← 40 Encrypted with an ESP Header →
← 50 Encrypted with an ESP Auth Trailer →

| 20 IP Header | 21 ESP Head. | 22 Init Vector | 23 GRE IP Head. | 24 GRE | 25 L2 Head. | 26 IP Head. | 27 TCP/UDP Head. | 28 Data | 29 ESP Trail. | 30 ESP Auth Trail. |
|---|---|---|---|---|---|---|---|---|---|---|

FIG. 2C

242 VPN Encapsulation

240

| ... | 204 Src_IP | 206 De_IP | 208 ... | 210 ESP | ... | 226 IPID | 222A Src_IP | 224A Des_IP | 227 ... | 228 Opt | 230 Other |
|---|---|---|---|---|---|---|---|---|---|---|---|
| ... | IP1 | IP2 | ... | ESP | ... | IPID | IP-Add | IP-Add | ... | Key | Other |

246 Private Source IP address    248 Private Source IP address

MECHANISMS FOR SOLVING AN IP FRAGMENTATION OVERLAPPING ISSUE IN L2VPN USING MULTIPLE IP ADDRESSES IN GRE HEADERS

BACKGROUND

Virtual private networks ("VPNs") allow users to connect from external networks to private networks safely and securely. To enable the secure connectivity, VPNs configure encrypted communications connections between user devices and the private networks. Because the connections are encrypted, data transmitted via the VPN tunnels is protected, and unauthorized individuals cannot eavesdrop on the transmitted traffic.

VPNs may be implemented using various security protocols. For example, some VPN tunnels are secured using Layer 3 protocols such as the Internet Protocol Security ("IPSec") protocol. To secure the IP-based communications, IPSec configures authenticated communications sessions and encrypts each packet of the session. Some other VPN tunnels are Layer 2 VPN ("L2VPN") tunnels and use the Generic Routing Encapsulation ("GRE") and IPSec protocols to encrypt the exchanged packets. L2VPN connectivity allows extending the L2 networks from on-premise-datacenters to cloud-based computer networks. L2VPN networks may support the datacenter migration and may dynamically engage off-premise compute resources to meet fluctuating demand.

Some L2VPN tunnels include two layers of encapsulations: a GRE encapsulation and an Encapsulating Security Payload ("ESP") encapsulation. GRE is a simple IP packet encapsulation protocol. GRE is used when IP packets need to be transmitted from one network to another without being parsed or treated like IP packets by the intervening routers.

ESP also encapsulates IP packets. However, it does that differently than GRE: unlike GRE, ESP applies cryptographic algorithms to contents of the packets so that the contents cannot be eavesdropped by the intervening routers. Applying the cryptographic algorithms to the contents may include scrambling the IP packets and transmitting the scrambled packets to a receiver. Since the transmitted packets are scrambled, the intervening routers cannot modify the contents of the packets.

However, encapsulating L2VPN packets with a GRE header and an ESP header may result in prepending more than 100 bytes of headers to the packets. Prepending that much data to each original Ethernet packet may cause the resulting packets to exceed a maximum packet size that intermediate devices are configured to handle.

Since a total length of each L2VPN packet should not exceed a certain length and since the GRE-ESP headers are usually long, the large packets need to be divided into small fragments, and the fragments need to be prepended with their own GRE-ESP headers. The process of dividing a packet into packet fragments is referred to as a packet fragmentation.

Original packets are usually divided into fragments by edge service gateways. As an edge service gateway divides an original packet into fragments, the gateway may determine a packet identifier for the packet. A packet identifier, also referred to herein as an Internet Protocol Identifier ("IPID"), is a packet sequence number that the gateway assigns to a detected packet. At first, the identifier is set to an initial value. Upon detecting a packet, the gateway increments the packet identifier by one, assigns the incremented identifier to the packet, divides the packet into fragments, and includes the identifier in the headers of the fragments. This is performed for all long packets. Once the identifier exceeds a certain limit, the identifier is reset to the initial value.

A typical field in a packet header that is used to store a packet identifier usually includes only 16 bits, and thus typical identifiers can range from zero to $(2^{16}-1)$. Once the identifier reaches $2^{16}$, the identifier needs to be reset to an initial value. However, such an identifier in today's fast computer networks need to be reset quite often. For example, if devices in a network are configured with a maximum transmission unit ("MTU") of 1500, wherein a MTU corresponds to a maximum size of packets that the devices may handle, if a combined GRE and ESP header is 100-byte-long, and if a 10 G uplink is configured to handle 800 k of packets having 1500 MTU per second, then a 16-bit-long identifier will be reset about $800 \text{ k}/2^{16}$ times per second, which is about 10 times per second.

Resetting a packet identifier, also referred to as an identifier wrapping, may have negative consequences on reliability of a network, especially on correctness of the packets that an edge service gateway assembles from the detected packet fragments. When an edge service gateway detects packet fragments, it relies on the packet identifiers associated with the fragments to assemble the fragments into the original packets. However, in fast L2VPN networks, the gateway often receives fragments that have the same packet identifier, but that actually belong to different original packets. For example, when the L2VPN network transmits the fragments from a sender to the receiver very fast, some of the received fragments with a particular identifier may belong to a first original packet, while other fragments with the same particular identifier may belong to a second original packet. This may happen when the sender resets the identifier before the receiver assembles the first original packet.

This problem is referred to as an incorrect splicing, IPID overflow, or mis-associating the packet identifiers to packet fragments, and has been described, for example, in U.S. patent application Ser. No. 16/232,887, entitled "Mechanisms for Preventing IPID Overflow in Computer Networks," which is incorporated herein by reference in its entirety.

SUMMARY

In an embodiment, mechanisms are presented for solving an IP fragmentation overlapping problem in L2VPN. The mechanisms use multiple private IP addresses to extend the range of IPIDs used to identify packet fragments. The mechanisms allow to reduce the frequency of overlapping the IPIDs that are assigned to the packet fragments transmitted via a L2VPN network. This in turn, allows to reduce the likelihood that a receiver of the fragments is unable to properly assemble original packets from the received packet fragments. For example, the mechanisms prevent the situations in which the receiver of the packet fragments receives the fragments that have the same IPID but that belong to two different original packets even though the receiver has not yet successfully assembled any of the two different original packets.

The presented mechanisms may prevent occurring of the following situation: suppose that large packets are tunneled using the same source IP address and via the same GRE tunnel. All these packets belong to the same L4 flow, and due to their large size, are fragmented into fragments. Suppose that one of the large packets of that flow is assigned a particular IPID and is divided into fragments. The particular IPID is stored in each of the fragments, and the fragments are transmitted to a receiver. Suppose that the receiver does not receive a $1^{st}$ fragment of the original packet because, for some reasons, the $1^{st}$ fragment is lost or dropped. Meanwhile, the sender resets the IPID to an initial value, divides new original packets into fragments, and assigns new IPIDs to the fragments. The receiver receives new fragments, some of which have the particular IPID. Those fragments, however, belong to a new original packet. But, since the receiver is unable to appreciate the difference, the receiver uses the $1^{st}$ fragment of the new original packet to continue assembling the previous original packet. This will negatively impact reliability of the network, especially correctness of the packets assembled by the receiver from the packet fragments. The approach described herein prevents such situations from occurring and does so by extending the range of the IPIDs assigned to the packets so that the IPIDs are not reset as frequently as in conventional systems.

In an embodiment, the mechanisms utilize a source IP address field and a destination IP address field in a GRE IP header that is added to each fragment of an original L2VPN packet. The two fields are not used for L2 packet forwarding, as it is described in detail later. Instead, the two fields are used to store, so called, private IP addresses. Since each of the two fields is 32-bit-long, the private IP addresses allow extending the range of the IPIDs by potentially 32+32 bits. Practical implementations, however, do not require that many bits for encoding the IPIDs in L2VPN networks. In fact, since the two fields are configured as IP address fields, using 100 different private IP address pairs appears to be sufficient to extend the range of the IPIDs to avoid the IPID overlapping issues.

In an embodiment, once a packet sender detects an original packet, the sender generates and assigns, to the original packet, an IPID that is 16-bit-long. The sender also divides the packet into fragments, and encapsulates each fragment with several headers, including an ESP header, a GRE IP header, a GRE header, L2 header, and so forth. Furthermore, the sender stores the IPID in an IPID field of the GRE IP header of each fragment. The sender also obtains two pre-defined private IP addresses and inserts them into a source IP address field and a destination IP address field, respectively, of the GRE IP header of each fragment. The two private IP addresses are used to extend the range of the IPIDs from 16 bits to potentially 16+32+32 bits. Practical implementations may use, however, only about 100 different private IP address pairs to sufficiently extend the range of the IPIDs in today's L2VPN networks.

Storing private IP addresses in a source IP address field and a destination IP address field of an GRE IP header added to a L2VPN fragment does not interfere with switching and/or routing of the fragment because that GRE IP header is not used to switch/route the fragment along a VPN connection. That GRE IP header is encapsulated with an ESP header and, since the content of the ESP packet is scrambled, that GRE IP header is scrambled and cannot be inspected by the switches and routers forwarding the fragment.

BRIEF DESCRIPTION OF THE DRAWINGS

In the drawings:

FIG. 2A is a block diagram depicting a portion of an example packet header of a non-VPN packet.

FIG. 2B is a block diagram depicting a portion of an example packet.

FIG. 2C is a block diagram depicting a portion of an example packet header of a L2VPN packet.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
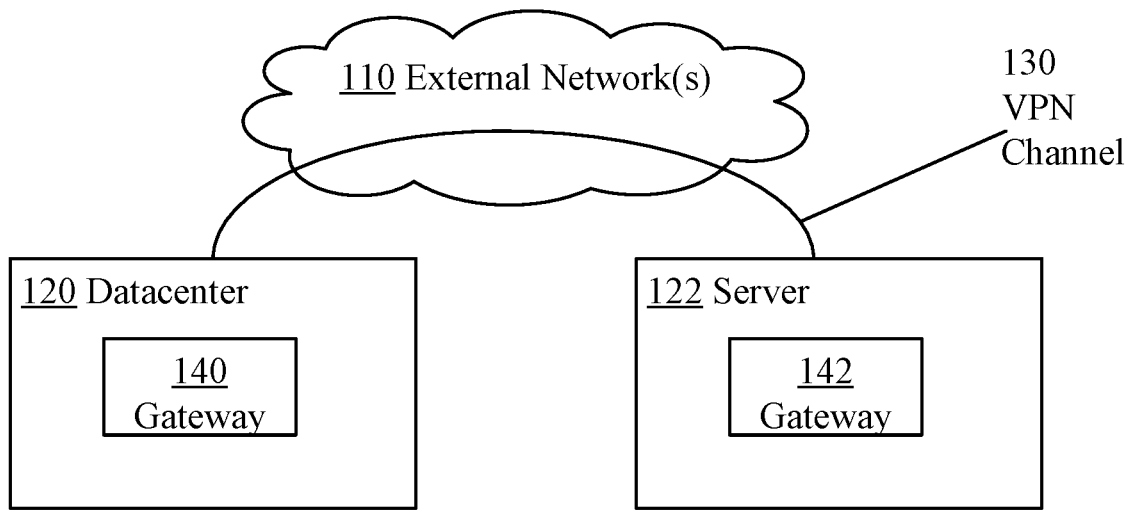
FIG. 1 is a block diagram depicting an example physical implementation view of an example logical network environment for implementing mechanisms for resolving an IP fragmentation overlapping occurring in L2VPN.

FIG. 1 is a block diagram depicting an example physical implementation view of an example logical network environment for implementing mechanisms for resolving an IP fragmentation overlapping occurring in L2VPN. The example implementation includes one or more datacenters 120, one or more servers 122, and one or more external networks 110. The configuration may include additional datacenters and additional servers.

Each datacenter 120 may include one or more computer hosts. To provide clear examples, however, datacenter 120 depicted in FIG. 1 is implemented in one host. A host is a computer device configured to implement virtual machines, edge service gateways, logical routers, logical switches, and the like. The host may be referred to as a computing device, a host computer, a host device, a physical server, a server system, or a physical machine.

Datacenter 120 may include a variety of components such as one or more gateways 140, one or more virtual machines, and the like. Datacenter 120 may also include forwarding elements such as routers and switches, additional VMs, additional gateways, and the like.

Server 122 may include several components such as one or more gateways 142, one or more virtual machines, and the like. Server 122 may also include forwarding elements, such as routers and switches, additional VMs, additional gateways, and the like.

Gateways 140 and 142 may be configured as edge service gateways and may provide network edge security and gateway services to VMs. Gateways 140 and 142 may be installed either as logical, distributed routers or as service gateways. Gateways 140 and 142 may be configured to connect isolated sub-networks to shared networks by providing common gateway services such as DHCP, VPN, NAT, dynamic routing, and load balancing services. In an embodiment, gateways 140 and 142 may be configured to implement VPN endpoints.

Users/applications executing in datacenter 120 and users/applications executing on server 122 may be connected via one or more VPN channels 130 that cross one or more external networks 110. VPN channel 130 is a safe and encrypted communications connection established over a less secure network, such as external network 110. VPN channel 130 uses the shared public infrastructure of external network 110 while maintaining data privacy through security procedures and tunneling protocols.

Datacenter 120 may establish VPN channel 130 between a user/application of datacenter 120 and a user/application executing on server 122 by obtaining, from an IP address manager (not shown in FIG. 1), a pair of IP addresses to be used by the user/application of datacenter 120 executing in datacenter 120 and the user/application executing on server 122.

A pair of IP addresses includes a local IP address and a remote IP address. The local IP address that is received by the user/application executing in datacenter 120 corresponds to a remote IP address that is assigned to the user/application executing on server 122, while the remote IP address received by the user/application executing in datacenter 120 corresponds to a local IP address assigned to the user/application executing on server 122. For example, as shown in a block 150, an IP address pair provided to a user/application executing in datacenter 120 includes a local IP1 address 36.19.191.1 and a remote IP2 address 54.69.101.2, while an example IP address pair provided to a user/application executing on server 122 includes a local IP1 address 54.69.101.2 and a remote IP2 address 36.19.191.1.

2. Example Encapsulations 2.1. Example Non-VPN Encapsulations

FIG. 2A is a block diagram depicting a portion of an example packet header of a non-VPN packet. A portion 220 of the packet may include a source IP address field 222, a destination IP address field 224, and other fields like the fields 225, 227, and 230, which are irrelevant to the approach described herein. Source IP address field 222 may be used to store a source IP address of a source device that transmitted the packet, while destination IP address field 224 may be used to store a destination IP address of a destination device of the packet. The packet may include a GRE header; however, since the packet is a non-VPN packet and the approach for L2VPN described herein is inapplicable to the packet, portion 220 of the packet does not store a private IP address pair.

2.2. Example VPN Encapsulations

FIG. 2B is a block diagram depicting a portion of an example packet. The depicted example is provided herein merely to illustrate that various headers may be prepended to an original packet before the packet is transmitted via a L2VPN network. In the depicted example, an original packet has been prepended several different headers, including an IP packet header 20, an ESP header 21, an initial vector 22, a GRE IP header 23, a GRE header, an L2 header 25, an IP header 26, a TCP/UDP header 27; in addition to a data portion 28, an ESP trailer 29, and an ESP authentication trailer 30. As shown in FIG. 2B, the components 21-28 are encrypted (element 40) with an ESP header 21, while the components 22-28 are encrypted (element 50) with an ESP Auth trailer.

FIG. 2C is a block diagram depicting a portion of an example packet header of a L2VPN packet. The depicted example header is used by the packets that may be communicated via a L2VPN communications tunnel. A portion 240 of the packet may include a VPN encapsulation portion 242, an ESP header 210, a GRE IP header 23 (which comprises an IPID field 226, a source IP address field 222A, a destination IP address filed 224A, and other fields), a GRE header 24 (which comprises an optional field 228 for storing a key), and other headers. A source IP address stored in field 204 and a destination IP address stored in field 206 are actual IP addresses that are used by edge gateways to forward the packet from a source gateway to a destination gateway. Those IP addresses do not correspond to the private IP addresses that are used to extend the range of IPIDs assigned to packets/fragments.

Fields 222A and 224A in FIG. 2C are used to extend the range of IPIDs assigned to packets. Those fields are not used to store the actual source-destination IP addresses used to route the packet. Instead, field 222A is used to store a source private IP address, while field 224A is used to store a destination private IP address, and both private IP addresses are used to extend the range for IPIDs assigned to original packets.

IPID field 226 is used to store an identification that is assigned to a packet. The IPID is generated for a packet by, for example, an edge gateway, when the gateway detects the packet. The IPID is usually a number selected from a range starting at zero and ending at $2^{16}-1$.

Since conventionally only 16 bits are used to encode an IPID in an IPv4 header, but there might be more than $2^{16}$ IPIDs in a L2VPN network, the 16 bits are not enough for encoding IPIDs before the IPID is reset to zero. To extend the range of the IPIDs, fields 222A and 224A are used. The fields are used to store additional information that, once combined with the IPID stored in key field 226, extend the range of the IPID so that the issue of the IP fragmentation overlapping may be avoided in L2VPN. The combined content of fields 222A, 224A and 226 is collectively referred to as a packet identifier.

In an embodiment, if a size of a received packet exceeds the allowable size of a packet, the packet is divided into fragments, and each fragment is encapsulated with several headers, including an ESP header, a GRE IP header, a GRE header, and other headers. Then, the gateway generates an IPID for the packet, and stores the IPID in IPID field 226 in each fragment. Furthermore, the gateway stores a source private IP address 246 in source IP address field 222A, and a destination private IP address 248 in destination IP address field 224A of the fragment. The fragments are then transmitted toward a destination.

Upon receiving a packet fragment, a fragment receiving gateway decapsulates the fragment, extracts a source private IP address from field 222A, extracts a destination private IP address from field 224A, and extracts an IPID from IPID field 226. The gateway then combines the private IP addresses with the IPID to form a resulting packet identifier. Then, the gateway determines whether other fragments having the same resulting packet identifier have been already received, and if so, adds the newly received fragment to that group to eventually assemble the fragments that have the same packet identifier into one original packet.

If the gateway determines that no other fragments having the particular packet identifier have been already received, then the gateway starts a new group of packet fragments, assigns the particular packet identifier to that group, and continues collecting fragments having the particular packet identifier.

2.3. Generating Private IP Addresses

In an embodiment, private IP addresses used to extend the range of IPIDs are generated in advance. Usually, the private IP addresses are non-public IP addresses, and may be selected from, for example, a 169.0.0.0 subnet.

In some L2VPN implementations, in which users do not provide a customized IP address pool, GRE IP addresses by default are from 169.254.0.0/16 subnet. Therefore, a default GRE IP address range is from 169.254.0.1 to 169.254.255.254. In an embodiment, a subset of the GRE IP addresses is selected and used as private IP address pairs. Since the private IP address pairs will be included in a GRE IP header that is subsequently encapsulated with an ESP header, that GRE IP header is not inspected by switches and routers that forward the packet along the L2VPN tunnel. Hence, the private IP address pairs that are included in that GRE IP header do not interfere with the forwarding of the packet.

The pre-generated private IP address pairs may be stored in any data structure, such as a table, configured to store multiple IP address pairs. The pre-generated private IP addresses may be also stored as a list. In this approach, two private IP addresses are taken from the list at the time, and next two private IP addresses are taken from the list by skipping either one private IP address, or two private IP addresses. If one private IP address is skipped, then two consecutive pairs are overlapping. On the other hand, if two private IP addresses are skipped, then two consecutive pairs do not overlap.

The private IP address pairs may be selected from a table, or a list, using many approaches. In one approach, the pairs are selected using a round-robin approach. In this approach, the pairs are selected in the order they are stored in the table or the list, and the selection is reset once the last pair from the table or the list is used. The round-robin approach is quite effective in decreasing the likelihood that two packets received from the same L4 flow use the same IPID.

According to another approach, the pairs are selected from a table, or a list, using a random algorithm. This approach may not be as effective in preventing the IPID packet fragmentation overlapping issues in L2VPN as using the round-robin approach.

Considering today's state of art of the L2VPN technology and today's packet transmission rates, using 100 different pairs of private IP addresses allows extending the range of the IPIDs to 100*2^16, which appears to be adequate in many implementations.

2.4. Load Balancing Aspect

In an embodiment, the approach for reducing the probability of overlapping IPIDs assigned to L2VPN packets is combined with a load balancing approach. In this approach, a hash value of the original packet, or of an IP header of the original packet, is computed and used to select a source private IP address from a table of private IP addresses. For example, a hash value of the inner IP header of a particular original packet may be computed, and the result may be used to select a private IP address pair from the table that stores the private IP addresses. For example, the result may be divided by a size of the table, and the obtained number may be used as an index to select a private IP address pair from the table.

3. First Example GRE Encapsulation of L2VPN Fragments

Figure 3:
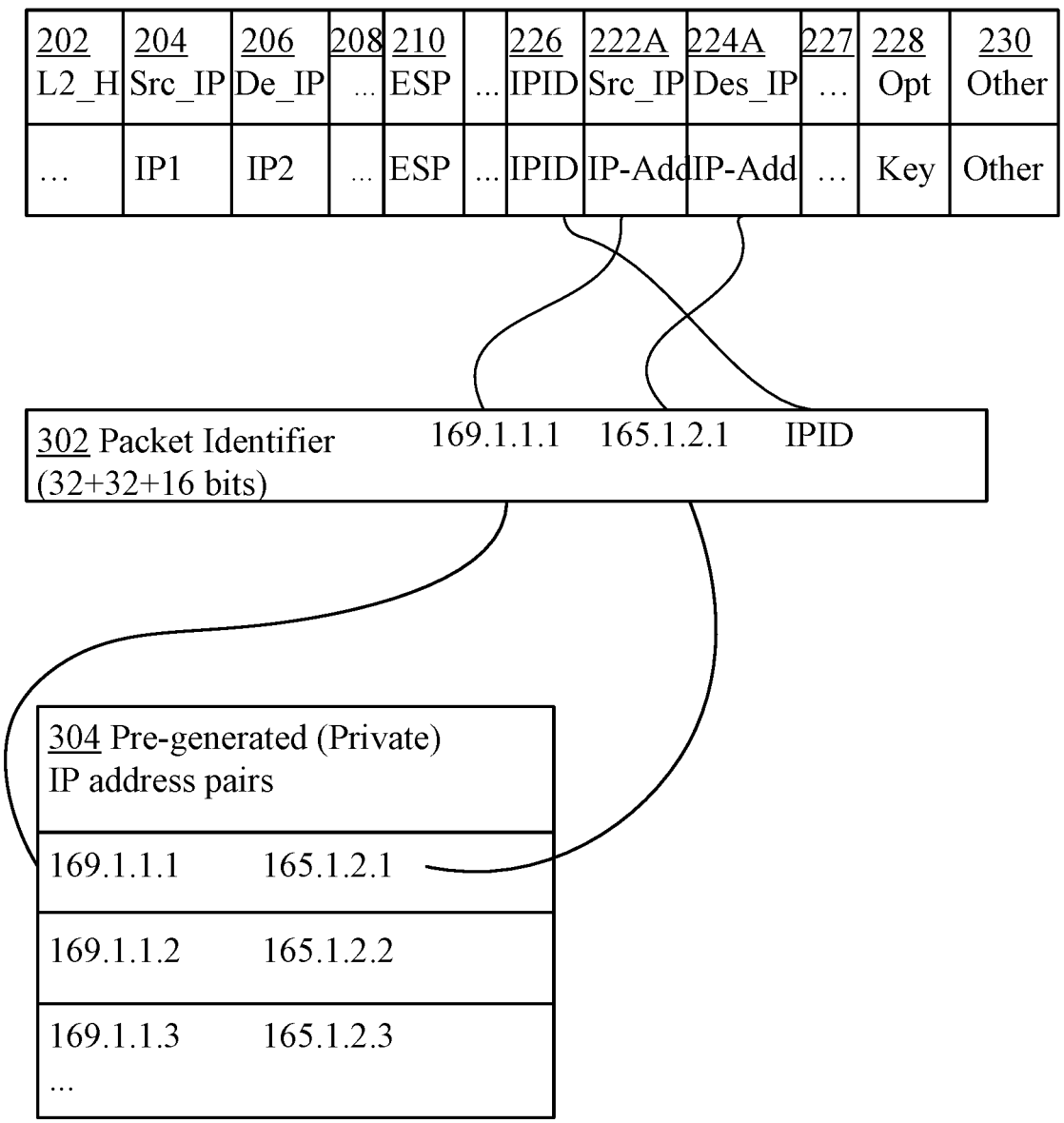
FIG. 3 is a block diagram depicting example mechanisms for preventing IPID overflow in L2VPN networks.

FIG. 3 is a block diagram depicting example mechanisms for preventing IPID overflow in L2VPN networks. The depicted example mechanisms use pre-generated private IP address pairs that are stored in a table 304. To extend the range of the IPIDs, private IP address pairs are taken from table 304. The ways the private IP address pairs are selected from table 304 may vary. In some implementations, the pairs are selected using a round-robin approach; in other implementations, the pairs are selected randomly or using hash values generated from IP headers of the fragments.

Private IP address pairs are usually generated in advance and according to the policies implemented in a datacenter. For example, the address pairs may be created based on some restrictions imposed by system administrator on the IP address ranges.

In the depicted example, a first IP address pair includes 169.1.1.1 and 165.1.1.2.1; a second IP address pair includes 169.1.1.2 and 169.1.2.2; and a third IP address pair includes 169.1.1.3 and 165.1.2.3.

An IPID is stored in field 226 of a GRE IP header of a packet fragment. A packet identifier 302 includes a source private IP address 169.1.1.1, a destination private IP address 165.1.2.1, and the IPID taken from field 226 of the GRE IP header. The source private IP address is stored in field 222A of the GRE IP header of the fragment, while the destination private IP address is stored in field 224A of the GRE IP header.

4. Second Example GRE Encapsulation of L2VPN Fragments

Figure 4:
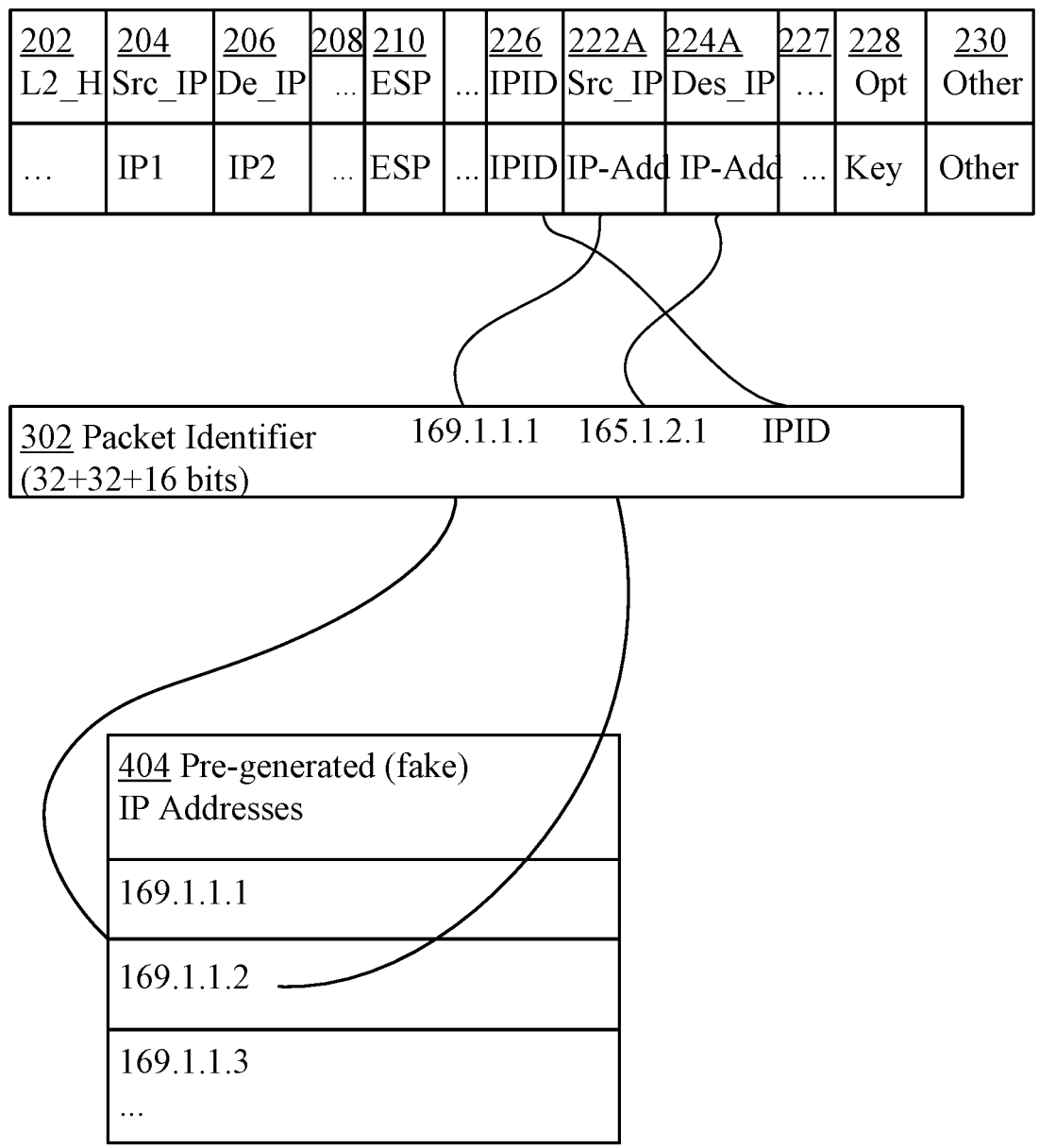
FIG. 4 is a block diagram depicting example mechanisms for preventing IPID overflow in L2VPN networks.

FIG. 4 is a block diagram depicting example mechanisms for preventing IPID overflow in L2VPN networks. The depicted example mechanisms use pre-generated private IP address pairs that are stored as a list 404. In an embodiment, list 404 includes individual private IP addresses. To extend the range of IPIDs, two private IP addresses are taken from list 404 at the time.

In the depicted example, a first private IP address is 169.1.1.1, a second private IP address is 169.1.1.2, a third private IP address is 169.1.1.3, and so forth.

An IPID is stored in field 226 of a GRE IP header of a packet fragment. A packet identifier 402 includes the private IP address 169.1.1.1, the private IP address 169.1.1.2, and the IPID taken from field 226 of the GRE IP header. The private IP address 169.1.1.1 is stored in field 222A of the GRE IP header of the fragment, while the private IP address 169.1.1.2 is stored in field 224A of the GRE IP header.

5. Extending a Range of IPIDs on a Sender Side

Figure 5:
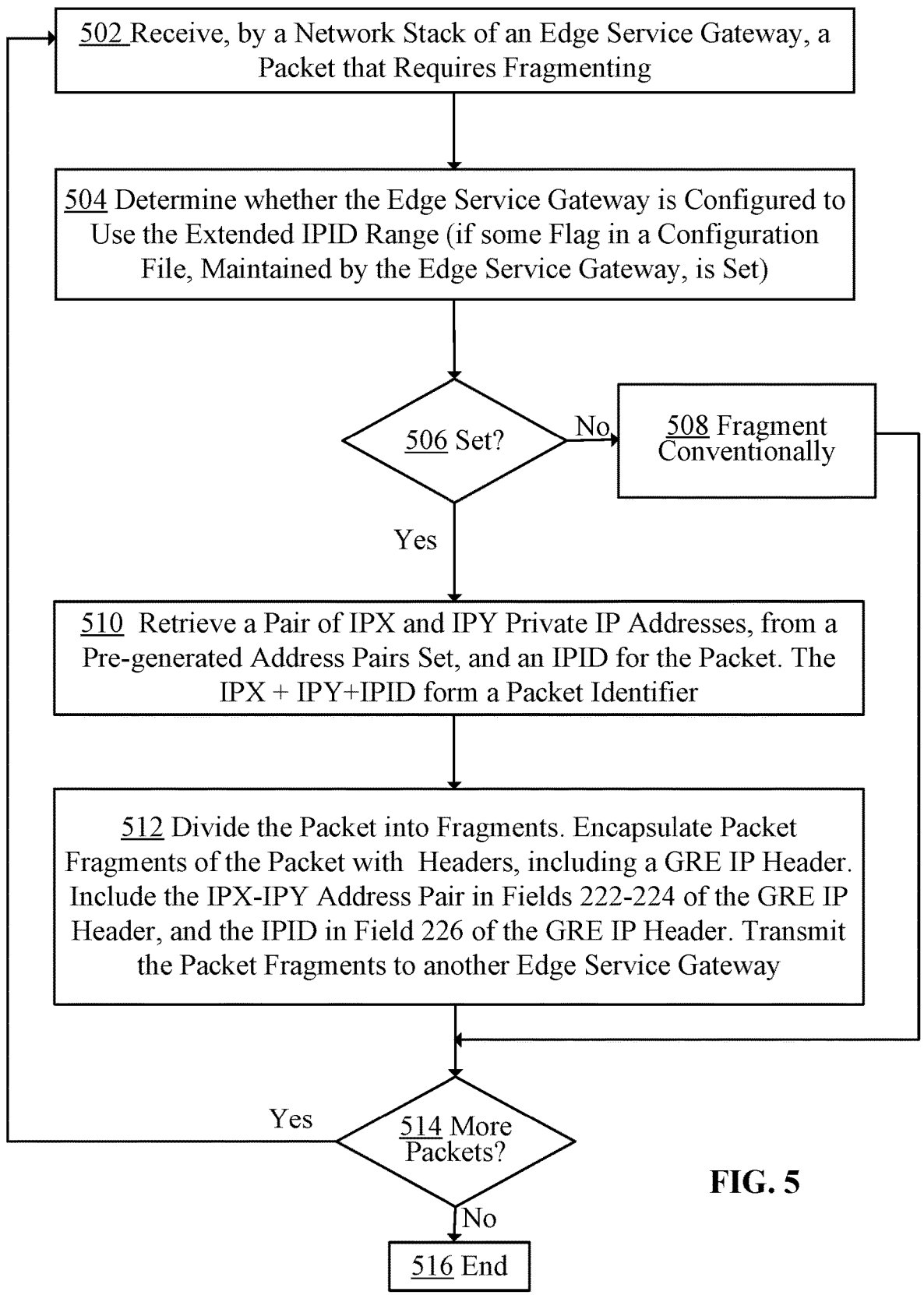
FIG. 5 is an example flow chart for preventing IPID overflow in L2VPN networks on a sender side.

FIG. 5 is an example flow chart for preventing IPID overflow in L2VPN networks on a sender side. The steps described in FIG. 5 may be implemented in an edge service gateway, or more specifically, in an agent or a network stack of the gateway.

In step 502, a network stack detects a packet that requires fragmenting. The network stack may be an agent and may be implemented in an edge service gateway. The packet requires fragmenting if the packet is too long to be sent from the gateway to a destination in one piece. For example, if devices in the network are configured to handle packets that are no more than 1500-byte-long, then packets longer than 1500 bytes need to be fragmented.

In step 504, the edge service gateway determines whether the gateway is configured to use the extended IPID range approach. This can be determined by checking whether a certain flag in a configuration file maintained by the gateway is set.

In step 506, if the gateway determines that the particular flag is set, then the gateway proceeds to performing step 510. Otherwise, the gateway proceeds to performing step 508, in which the gateway performs the packet fragmenting using any available conventional approach.

In step 510, the gateway retrieves a pair of private IP addresses. Suppose that the pair includes an IPX private IP address and an IPY private IP address. The pair may be retrieved from a table, such table 304, or from a list, such as list 404.

In step 512, the gateway divides the packet into fragments, and encapsulates each packet fragment with an ESP header, a GRE IP header, a GRE header, an IP header, an Ethernet header, and so forth. Then, the gateway includes, in the GRE IP header of each packet fragment, an IPX private IP address in field 222A, and an IPY private IP address in field 224A. Furthermore, the gateway obtains an IPID for the packet and includes the IPID in field 226 of the GRE IP header. The combined content of fields 222A, 224A and 226 is collectively referred to as a packet identifier.

Then, the gateway transmits the packet fragment to another edge service gateway.

In step 514, the gateway checks whether additional packets have been detected. If the additional packets have been detected, then the gateway proceeds to step 502 described above. Otherwise, the gateway proceeds to step 516 and ends executing.

6. Extending a Range of IPIDs on a Receiver Side

Figure 6:
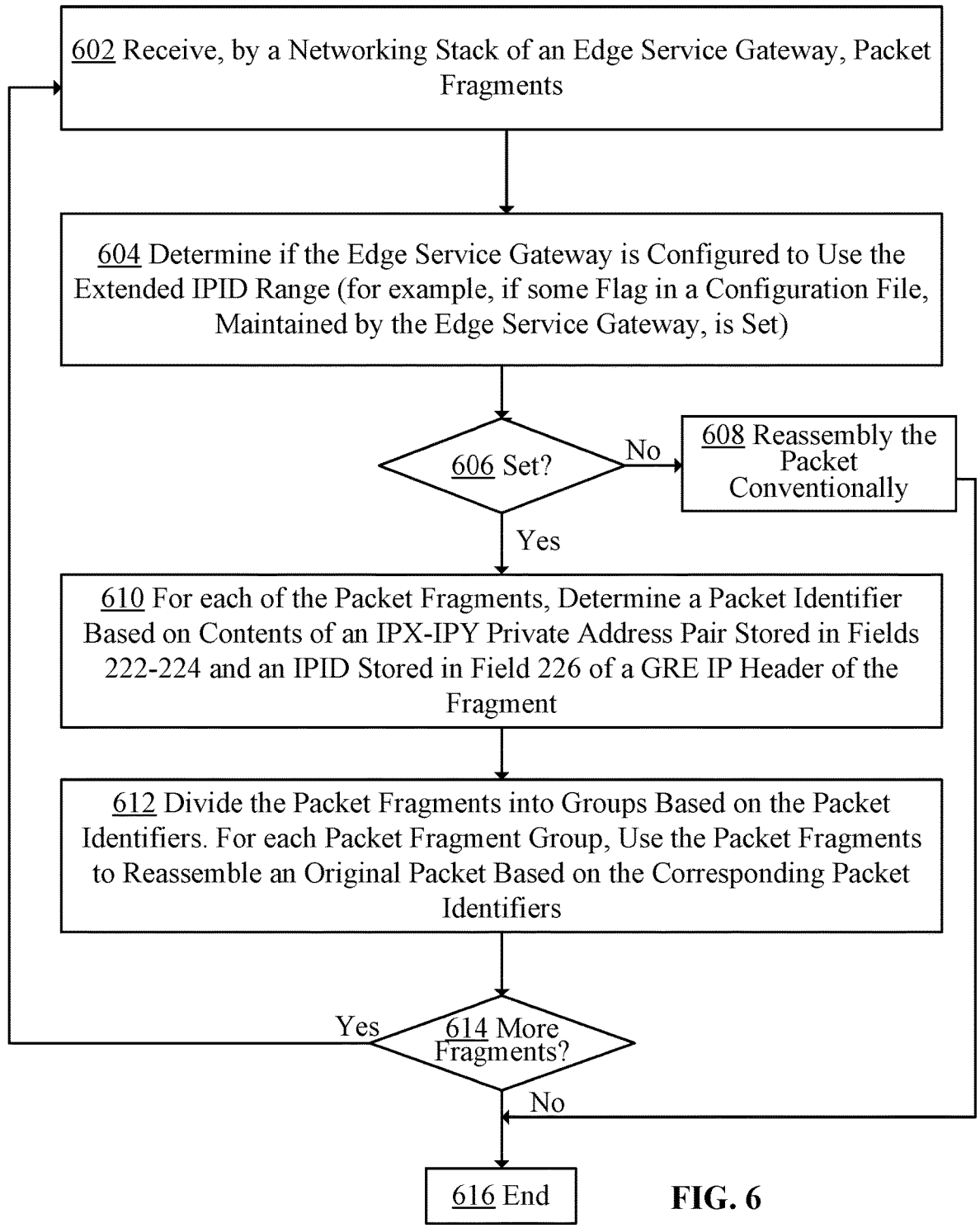
FIG. 6 is an example flow chart for preventing IPID overflow in L2VPN networks on a receiver side.

FIG. 6 is an example flow chart for preventing IPID overflow in L2VPN networks on a receiver side. The steps described in FIG. 6 may be implemented in an edge service gateway, or more specifically in an agent or a network stack of the gateway.

In step 602, a networking stack detects one or more packet fragments. The packet fragments may be detected by the gateway on ports and the network stack may be informed that the fragments have been detected.

In step 604, the gateway determines whether the gateway is configured to use the extended IPID range approach. The determination may be performed by checking a particular flag included in the configuration file that is maintained by the gateway. If that particular flag is set, then the gateway may determine that the gateway is configured to use the extended IPID range approach.

In step 606, if the gateway determines that the gateway is configured to use the extended case approach, then the gateway proceeds to performing step 610. Otherwise, the gateway proceeds to performing step 608, in which the gateway reassembles the packet fragments into original packets using any conventional approach.

In step 610, the gateway determines a packet identifier for each of the packet fragments. The packet identifier for a packet fragment is determined based on the contents of an IPX-IPY private IP address pair stored in fields 222-224, and an IPID stored in field 226 of an GRE IP header of the packet fragment. The combined content of fields 222A, 224A and 226 is collectively referred to as a packet identifier.

In step 612, the gateway divides the packet fragments into groups based on the corresponding packet identifiers. For each of the packet fragment groups, the gateway uses the packet fragments to reassemble the fragments into an original packet. If, for a particular packet fragment group, all fragments in the group have been received by the gateway, then the gateway may successfully reassemble the packet fragments into the original packet. However, if, for a particular packet fragment group, some fragments still have not been received by the gateway, then the gateway continues awaiting the missing packet fragments.

If, in step 614, the gateway determines that new packet fragments have been received or detected by the gateway, then the gateway proceeds to performing step 602, described above. Otherwise, the gateway proceeds to performing step 616 and ends executing.

7. Improvements Provided by Certain Embodiments

In an embodiment, an approach provides mechanisms for preventing IPID overflow in L2VPN networks. The mechanisms include extending the range of IPIDs from $2^{16}-1$ to, for example, $100 \times 2^{16}$ or more.

In an embodiment, the mechanisms allow resetting an IPID only after the IPID exceeds the extended range which is much larger than the conventional range of $2^{16}$. This provides significant improvements over the conventional approaches in which the IPID is reset frequently, i.e., as soon as the IPID reaches $2^{16}$. Resetting the IPID less often decreases the likelihood of the IPID overflow and mis-assigning the IPIDs to packets. Having the larger IPID range allows preventing and avoiding the IPID collision and re-reassembling errors.

8. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

9. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

What is claimed is:

1. A computer-implemented method for using multiple IP addresses in Generic Routing Encapsulation ("GRE") IP headers to prevent Internet Protocol Identifier ("IPID") fragmentation overlapping in L2VPN networks, the method comprising:
   receiving, by an edge service gateway, a packet that requires fragmentating;
   determining whether the edge service gateway is configured to prevent IPID fragmentation overlapping;
   in response to determining that the edge service gateway is configured to prevent IPID fragmentation overlapping:
      creating a plurality of packet fragments based on, at least in part, the packet;
      wherein a packet fragment of the plurality of packet fragments:
         comprises a GRE IP header, one or more additional headers, and a portion of the packet;
         stores an IPID generated for the packet in an IPID field in the GRE IP header;
         stores a source private IP address in a source IP address field in the GRE header;
         stores a destination private IP address in a destination IP address field in the GRE header; and
         wherein the source private IP address, the destination private IP address and the IPID collectively form a packet identifier of the packet.

2. The computer-implemented method of claim 1, wherein the source private IP address and the destination private IP address are retrieved from a set of private IP addresses generated prior to deployment of the edge service gateway.

3. The computer-implemented method of claim 1, wherein the source private IP address and the destination private IP address are stored in the GRE IP header that stores information that is not used to switch or route the packet fragment.

4. The computer-implemented method of claim 1, wherein the packet fragment is a L2VPN packet fragment and is communicated within a L2VPN computer network.

5. The computer-implemented method of claim 1, wherein determining whether the edge service gateway is configured to prevent IPID fragmentation overlapping comprises:
   determining whether a particular flag in a configuration file maintained by the edge service gateway is set;
   in response to determining that the particular flag in the configuration file is set, determining that the edge service gateway is configured to prevent IPID overflow; and
   in response to determining that the particular flag in the configuration file is not set, determining that the edge service gateway is not configured to prevent IPID overflow.

6. The computer-implemented method of claim 1, wherein the source private IP address and the destination private IP address are retrieved from a set of private IP addresses using any one of: a round-robin approach, a random approach, or a hash-based approach.

7. The computer-implemented method of claim 1, further comprising: receiving, by the edge service gateway, a packet fragment that requires reassembling into an original packet;
   determining whether the edge service gateway is configured to prevent IPID fragmentation overlapping;
   in response to determining that the edge service gateway is configured to prevent IPID overflow:
      determining a packet identifier of the packet fragment based on a source IP address stored in a GRE IP header of the packet fragment, a destination IP address stored in the GRE IP header of the packet fragment, and an IPID stored in the GRE IP header of the packet fragment; and
      based on, at least in part, the packet identifier, the packet fragment and one or more other packet fragments having the packet identifier, reassembling the original packet that is associated with the packet identifier.

8. One or more non-transitory computer-readable storage media storing one or more computer instructions which, when executed by one or more processors, cause the one or more processors to perform:
   receiving, by an edge service gateway, a packet that requires fragmentating;
   determining whether the edge service gateway is configured to prevent Internet Protocol Identifier ("IPID") fragmentation overlapping;
   in response to determining that the edge service gateway is configured to prevent IPID fragmentation overlapping:
      creating a plurality of packet fragments based on, at least in part, the packet;
      wherein a packet fragment of the plurality of packet fragments:
         comprises a Generic Routing Encapsulation ("GRE") IP header, one or more additional headers, and a portion of the packet;
         stores an IPID generated for the packet in an IPID field in the GRE IP header;
         stores a source private IP address in a source IP address field in the GRE header;
         stores a destination private IP address in a destination IP address field in the GRE header; and
         wherein the source private IP address, the destination private IP address and the IPID collectively form a packet identifier of the packet.

9. The one or more non-transitory computer-readable storage media of claim 8, wherein the source private IP address and the destination private IP address are retrieved from a set of private IP addresses generated prior to deployment of the edge service gateway.

10. The one or more non-transitory computer-readable storage media of claim 8, wherein the source private IP address and the destination private IP address are stored in the GRE IP header that stores information that is not used to switch or route the packet fragment.

11. The one or more non-transitory computer-readable storage media of claim 8, wherein the packet fragment is a L2VPN packet fragment and is communicated within a L2VPN computer network.

12. The one or more non-transitory computer-readable storage media of claim 8, wherein determining whether the edge service gateway is configured to prevent IPID fragmentation overlapping comprises:
   determining whether a particular flag in a configuration file maintained by the edge service gateway is set;

in response to determining that the particular flag in the configuration file is set, determining that the edge service gateway is configured to prevent IPID overflow; and in response to determining that the particular flag in the configuration file is not set, determining that the edge service gateway is not configured to prevent IPID overflow.

13. The one or more non-transitory computer-readable storage media of claim 8, wherein the source private IP address and the destination private IP address are retrieved from a set of private IP addresses using any one of: a round-robin approach, a random approach, or a hash-based approach.

14. The one or more non-transitory computer-readable storage media of claim 8, storing additional instructions for:
receiving, by the edge service gateway, a packet fragment that requires reassembling into an original packet;
determining whether the edge service gateway is configured to prevent IPID fragmentation overlapping;
in response to determining that the edge service gateway is configured to prevent IPID overflow:
determining a packet identifier of the packet fragment based on a source IP address stored in a GRE IP header of the packet fragment, a destination IP address stored in the GRE IP header of the packet fragment, and an IPID stored in the GRE IP header of the packet fragment; and
based on, at least in part, the packet identifier, the packet fragment and one or more other packet fragments having the packet identifier, reassembling the original packet that is associated with the packet identifier.

15. An edge service gateway implemented in a computer network and configured to implement mechanisms for using multiple IP addresses in Generic Routing Encapsulation ("GRE") IP headers to prevent Internet Protocol Identifier ("IPID") fragmentation overlapping in L2VPN networks, the edge service gateway comprising:
one or more processors;
one or more memory units; and
one or more non-transitory computer-readable storage media storing one or more computer instructions which, when executed by the one or more processors, cause the one or more processors to perform:
receiving, by an edge service gateway, a packet that requires fragmentating;
determining whether the edge service gateway is configured to prevent IPID fragmentation overlapping;
in response to determining that the edge service gateway is configured to prevent IPID fragmentation overlapping:
creating a plurality of packet fragments based on, at least in part, the packet;
wherein a packet fragment of the plurality of packet fragments:
comprises a GRE IP header, one or more additional headers, and a portion of the packet;
stores an IPID generated for the packet in an IPID field in the GRE IP header;
stores a source private IP address in a source IP address field in the GRE header;
stores a destination private IP address in a destination IP address field in the GRE header; and
wherein the source private IP address, the destination private IP address and the IPID collectively form a packet identifier of the packet.

16. The edge service gateway of claim 15, wherein the source private IP address and the destination private IP address are retrieved from a set of private IP addresses generated prior to deployment of the edge service gateway.

17. The edge service gateway of claim 15, wherein the source private IP address and the destination private IP address are stored in the GRE IP header that stores information that is not used to switch or route the packet fragment.

18. The edge service gateway of claim 15, wherein the packet fragment is a L2VPN packet fragment and is communicated within a L2VPN computer network.

19. The edge service gateway of claim 15, wherein determining whether the edge service gateway is configured to prevent IPID fragmentation overlapping comprises:
determining whether a particular flag in a configuration file maintained by the edge service gateway is set;
in response to determining that the particular flag in the configuration file is set, determining that the edge service gateway is configured to prevent IPID overflow; and
in response to determining that the particular flag in the configuration file is not set, determining that the edge service gateway is not configured to prevent IPID overflow.

20. The edge service gateway of claim 15, storing additional instructions for: receiving, by the edge service gateway, a packet fragment that requires reassembling into an original packet;
determining whether the edge service gateway is configured to prevent IPID fragmentation overlapping;
in response to determining that the edge service gateway is configured to prevent IPID overflow:
determining a packet identifier of the packet fragment based on a source IP address stored in a GRE IP header of the packet fragment, a destination IP address stored in the GRE IP header of the packet fragment, and an IPID stored in the GRE IP header of the packet fragment; and
based on, at least in part, the packet identifier, the packet fragment and one or more other packet fragments having the packet identifier, reassembling the original packet that is associated with the packet identifier.

* * * * *